Dec. 31, 1935.     H. M. ROCKWELL     2,026,401
BRAKE FOR AUTOMOTIVE VEHICLES
Original Filed April 8, 1930    2 Sheets—Sheet 1
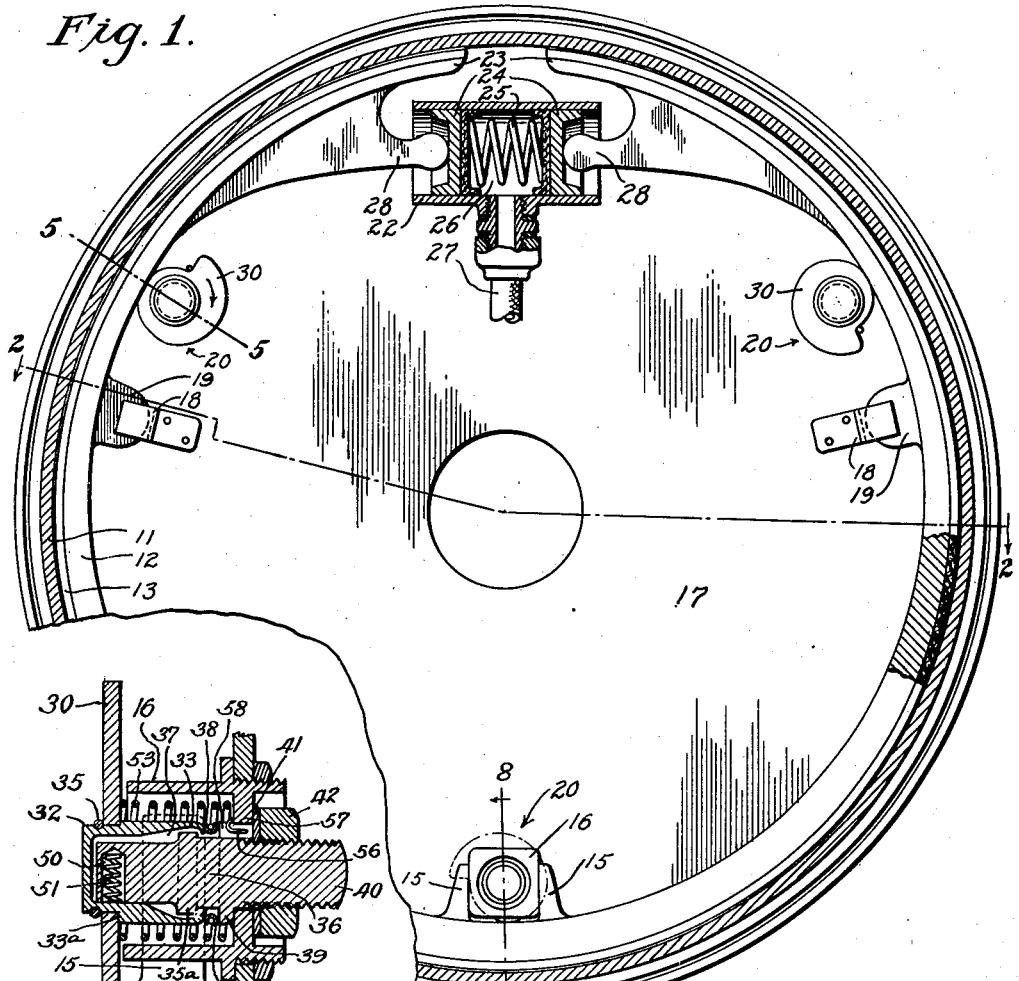
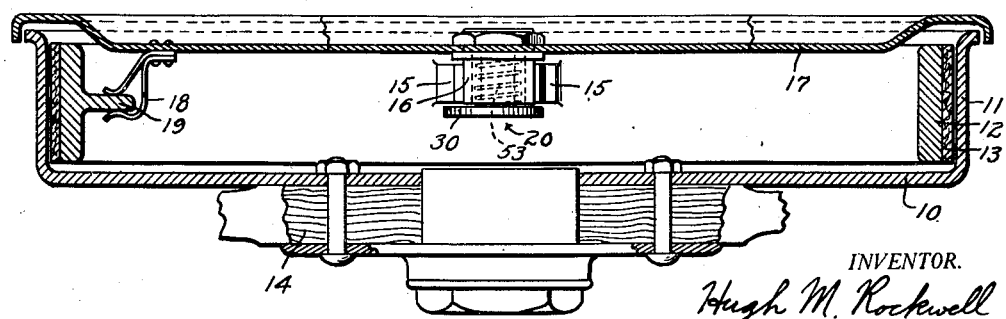
INVENTOR.
Hugh M. Rockwell
BY George L. Ljunglof
ATTORNEY.

Dec. 31, 1935.　　　　H. M. ROCKWELL　　　　2,026,401
BRAKE FOR AUTOMOTIVE VEHICLES
Original Filed April 8, 1930　2 Sheets-Sheet 2
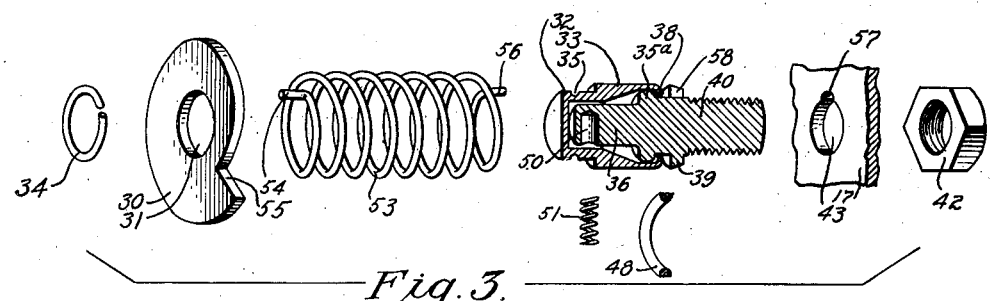
Fig. 3.
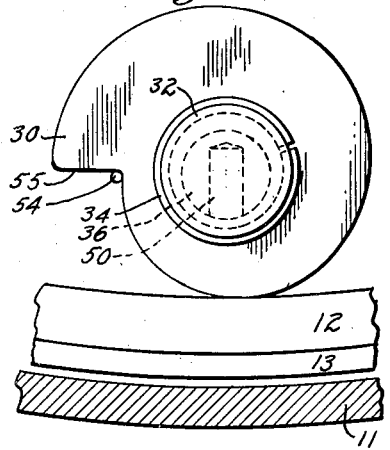
Fig. 4.
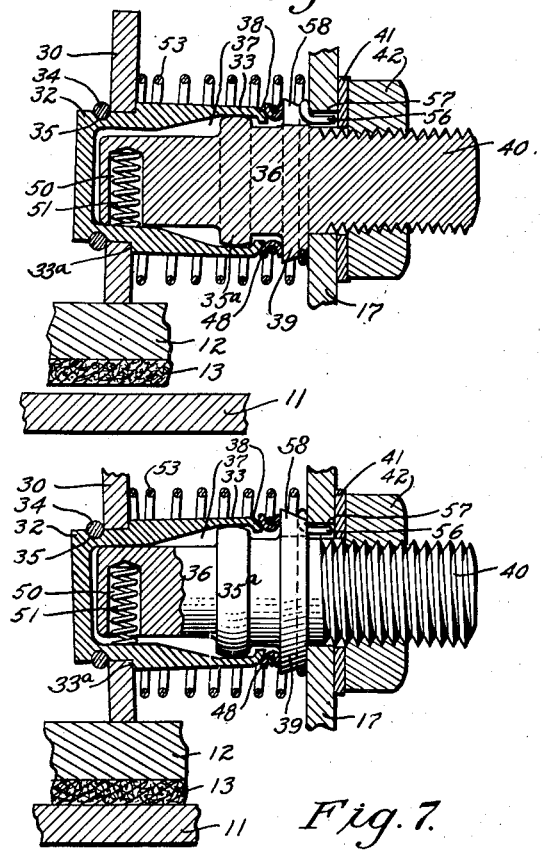
Fig. 5.
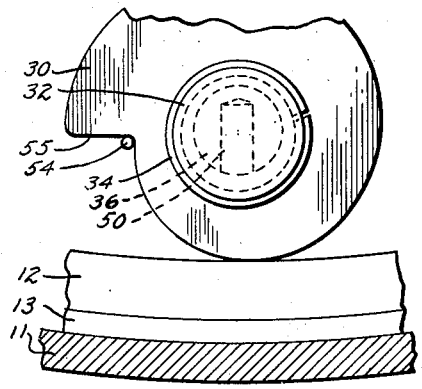
Fig. 6.
Fig. 7.
INVENTOR.
Hugh M. Rockwell
BY
George L. Ljunglof
ATTORNEY.

Patented Dec. 31, 1935

2,026,401

UNITED STATES PATENT OFFICE 2,026,401

BRAKE FOR AUTOMOTIVE VEHICLES

Hugh M. Rockwell, Freeport, N. Y.

Refiled for abandoned application Serial No. 442,639, April 8, 1930. This application May 2, 1932, Serial No. 608,840

21 Claims. (Cl. 188—79.5)

This invention relates to improvements in friction brakes, such for example, as are used in automotive vehicles, airplanes, and the like, and it contemplates more particularly novel means for automatically adjusting the brakes to compensate for wear, and thus to maintain a definite, predetermined clearance between the brake drum and brake band when disengaged.

The continuing upward trend of average driving speeds and congested traffic conditions has emphasized the importance of efficient brakes in automotive vehicles. Therefore, most brakes are provided with means of one kind or another to permit manual adjustment from time to time as the brake band linings become worn. Unless these adjustments are made, the parts of the brake system will have certain lost motions which very substantially reduce the efficiency of the brakes. Furthermore, if the adjustments are not skilfully made, they may result in a lack of equalization, a condition which in itself is dangerous. In many instances, these adjustments are entirely neglected because the parts are not easily accessible. But these and other objectionable features of the prior art are overcome by the present invention, which has for one of its principal objects the provision of a novel and simplified mechanism for automatically adjusting the brakes to compensate for wear and to prevent lost motion. By eliminating lost motion, a greater leverage can be obtained or employed, contributing further to the efficiency of the whole brake system.

In one aspect, the invention is an improvement on the mechanism disclosed in my pending application filed September 10, 1927, Serial Number 218,657, the present application being a re-filing of my application Serial Number 442,639, filed April 8, 1930.

Other objects, features and advantages of the invention will be readily apparent from the following description in connection with the accompanying drawings, wherein one form of the invention has been shown by way of illustration, and wherein Figure 1 is an end view, partly broken away and partly in section, of a vehicle brake embodying the invention;

Figure 2 is a transverse, sectional view through the same substantially on the line 2—2 of Figure 1;

Figure 3 is an exploded view of one of the slack take-up units;

Figure 4 is a fragmentary end view of the brake drum, brake band and take-up unit, with the brake disengaged;

Figure 5 is a transverse, sectional view of the same, substantially on line 5—5 of Figure 1;

Figure 6 is a view similar to Figure 4, with the brake applied, and

Figure 7 is a view similar to Figure 5 but with the brake applied as in Figure 6.

Figure 8 is a fragmentary sectional view taken on line 8—8 of Figure 1.

The invention has been shown in the drawings as applied to a brake of the internal expanding band type, but it is not limited in this respect, since its salient features may be employed in other types of brakes with equal advantage. The brake includes a rotatable brake drum 10, having an annular peripheral flange 11 within which is a brake band 12, the outer face of which is lined with friction material 13 for engaging the inner surface of the flange 11. The drum 10 may be secured to some suitable rotatable element, such as an automobile wheel 14, while the band 12 is held against rotation and adapted for alternate expansion and contraction to engage or disengage the brake drum flange 11.

The brake band 12 may be of any desired type, that illustrated being in the nature of a split ring of cast iron having sufficient inherent resiliency to retract after the expanding pressure has been relieved. Intermediate its ends, the brake band is formed with a pair of spaced lugs 15 which straddle and engage opposite sides of an anchor post 16 extending inwardly from a fixed annular dust plate or brake support 17. This brake support 17 is so proportioned and arranged as substantially to cover the inner side of the brake drum, and it carries suitably spaced spring fingers or guides 18, the free ends of which engage inwardly extending lugs 19 on the brake band, whereby to prevent axial movement of the brake band with reference to the brake drum. As previously stated, the brake band tends to contract, whereby to be normally disengaged from the brake drum flange 11, but it is limited in such retraction, and is supported in a substantially central position by stop units 20 at spaced intervals, as best shown in Figure 1. The stop units 20 are mounted upon the brake support 17, and as they constitute the principal feature of the invention, they will be hereinafter described in detail.

Any desired brake actuating means may be employed, that illustrated being hydraulically operated and including a pressure cylinder 22, which is secured to the supporting member 17 adjacent the spaced ends 23 of the brake band. Pistons 24 are slidably mounted in the opposite ends of the cylinder 22 and maintained in spaced relation by a light compression spring 25 and by pressure fluid, such as oil. The fluid space 26 between the pistons is in constant communication with a master cylinder, as usual, through an oil conduit 27, and by increasing or decreasing the fluid pressure in the master cylinder, the brake band may be expanded or contracted respectively to apply or to release the brake. Adjacent its ends 23, the brake band is provided on its inner side with arms 28, the ends of which are rounded and in opposition to each other, and are disposed in the opposite ends of the pressure cylinder 22 and in abutting engagement with the pistons 24. In this way, outward movement of the pistons, due to increased fluid pressure, is transmitted to the brake band to expand the same.

Referring again to the brake band stop units 20, it will be noted that there are three such units illustrated in the drawings, equidistantly spaced, but any other number of them may be employed if desired, and as they are all alike in structure, a detailed description of only one of them will be sufficient for a complete understanding of the invention. By reference particularly to Figs. 3 to 7, it will be seen that each unit 20 comprises an automatically adjustable stop 30 in the nature of a spiral or convolute cam, the edge of which is always in contact with the inner periphery of the brake band 12. This stop or cam 30 is formed of a flat metal plate, and has a central opening 31 by virtue of which it is rotatably mounted upon a cylindrical end portion 32 of a sleeve 33. A snap ring 34 seats in a groove 35 in said cylindrical portion to maintain the stop or cam 30 squarely against a shoulder 33a on the sleeve 33.

As previously stated, the edges of the stops or cams 30 are always in contact with the inner periphery of the brake band 12, but since the brake band is capable of expanding and contracting, it is necessary to provide for corresponding movements of the stops. This is accomplished by mounting each sleeve 33 rockably upon an annular flange 35a which is formed intermediate the ends of a supporting post 36. The periphery of this flange is curved longitudinally, as best shown in Figs. 5 and 7, and fits somewhat loosely within a bore 37 in the sleeve 33, the end of which is spun over as at 38 to retain the sleeve on the post. Rearwardly of the flange 35a, the post has an anchoring flange 39 and a screw-threaded shank 40 which, in cooperation with a washer 41 and a clamping nut 42, serve to secure the post to the supporting member 17. Thus the threaded shank 40 extends through a clearance hole 43 in the member 17 with its axis substantially parallel with that of the brake drum, and it may be held against rotation by any suitable means. If desired, a yielding dust washer 48 of felt or other suitable material may be disposed between the front face of the flange 39 and the spun end 38 of the sleeve.

Forwardly of the flange 35a, the post 36 is of slightly reduced diameter, and is provided with a transverse bore 50 constituting a socket for the reception of one end of a coiled compression spring 51, the other end of which bears against one side of the inner portion of the sleeve bore 37. This inner portion of the sleeve bore 37 is of a diameter greater than that of the corresponding adjacent end of the post 36, and the difference between these two diameters is substantially equal to the amount of radial movement of the brake band in expanding and contracting. Now, the bore 50 and spring 51 of each of the take-up units are disposed radially with reference to the axis of the brake drum, and in such a way that when the brake band 12 is in its released position (Figs. 1, 4 and 5) the spring 51 will be compressed. In this condition the free end of the sleeve 33 is thrown slightly off center but limited by the abutment of the interior of the sleeve with the exterior of the post 36. As the brake is applied, however, by expanding the brake band, the spring 51 acts to throw the sleeve 33 off center in the opposite direction (Figs. 6 and 7) and thus to maintain the cam 30 in engagement with the brake band.

In order that the brake may always be applied with the same amount of movement, it is necessary to compensate for wear of the brake band lining 13. This is accomplished by a torsion spring 53 which surrounds the sleeve 33 and has its free end 54 engaging a shoulder 55 on the cam 30 whereby to normally turn said cam and maintain it in a definite frictional relationship with the brake band. The other end 56 of the torsion spring 53 is anchored in a slot 57 at one side of the clearance hole 43 and also passes through a notch 58 in the flange 39, whereby to lock the post 36 against rotation.

The take-up unit 20 which is diametrically opposed to the pressure cylinder 22, is of the same construction as the others, with the exception that its stud, sleeve and torsion spring are disposed within the anchor post 16, which prevents rotation of the brake band.

The structure and operation of the invention should be clearly understood from the foregoing description, and so only a brief recapitulation will be resorted to. In the normal position of rest, that is with the brake released, the brake band lining 13 is entirely out of contact with the inner periphery of the brake drum flange 11, by reason of the fact that the brake band 12 is contracted. The cam members 30 of the several units 20, in cooperation with the sleeves 33 and posts 36, support the brake band in substantially central position, and limit its contracting movement. The clearance provided between the post 36 and the sleeve 33 determines the brake shoe clearance maintained by the device.

As the fluid pressure is increased within the cylinder 22, the pistons 24 move apart and act upon the opposed arms 28 to expand the brake band 12 and thus to apply the brake. As the brake band 12 thus expands, the compression springs 51 serve to rock their respective sleeves 33 upon the supporting flanges 35 and thus permit the stop cams 30 to follow the brake band and to maintain their definite relationship. After continued use, the brake band lining will, of course, become worn, tending to increase the clearance, whereupon the cams 30 will automatically be slightly rotated by their respective torsion springs 53 and thus adjusted to compensate for such wear, the cams being constantly maintained in engagement with the brake band. Hence, the brake band clearance will always be maintained at its predetermined value, and as a result, the braking efficiency of the system will be kept up to its maximum.

From the foregoing it is evident that an important advance has been made in the art to which this invention relates, by providing means for automatically adjusting the brakes as they become worn, and thus maintaining a definite clearance between the brake band and the brake drum. The arrangement is extremely simple, lending itself to economical production and to dependability in service. Obviously, the invention is susceptible of numerous modifications in the details of construction and arrangement of parts, and the right is herein reserved to make such changes as fall within the scope of the appended claims, without departing from the spirit of the invention.

Having thus described my invention, what I claim is:

1. In a brake, a rotatable brake drum, a brake band adapted to be alternately engaged with and disengaged from said brake drum, and a plurality of spaced stop members to limit the disengaging movement of the brake band to maintain a predetermined clearance, said stop members having limited floating movement in radial directions and being in constant engagement with the brake band.

2. In a brake, a rotatable brake drum, a brake band adapted to be alternately engaged with and disengaged from said brake drum, and a plurality of spaced stop members to limit the disengaging movement of the brake band to maintain a predetermined clearance, said stop members having limited floating movement in radial directions and being in constant engagement with the brake band and being automatically adjustable to compensate for wear of the brake band.

3. In a brake, a rotatable brake drum, a brake band adapted to be alternately engaged with and disengaged from said brake drum, and a plurality of stop members to limit the disengaging movement of the brake band to maintain a predetermined clearance, each of said stop members being in the nature of an automatically adjustable cam which is in constant engagement with the brake band, and adapted to compensate for wear of the brake band, and each of said stop cams having limited floating movement in radial directions within the normal operating clearance.

4. In a brake, a rotatable brake drum, a brake band adapted to be alternately engaged with and disengaged from the brake drum, and a plurality of slack take-up units radially spaced about the brake drum, each of said take-up units comprising a spring-actuated cam in constant frictional engagement with the brake band to limit the disengaging movement thereof, whereby to maintain a predetermined clearance.

5. In a brake, a rotatable brake drum, an expansible and retractible brake band disposed within the brake drum, and a plurality of automatically adjustable cams for limiting the retraction of the brake band to a predetermined clearance, said cams being rotatable about axes which are substantially parallel with that of the brake drum, and said cams being adapted to float within limits whereby to maintain constant contact with the brake band.

6. In a brake, a rotatable brake drum, a brake band adapted to be alternately engaged with and disengaged from said brake drum, and an automatically adjustable cam for limiting the disengaging movement of the brake band to maintain a predetermined clearance, said cam being in constant engagement with the brake band.

7. In a brake, a rotatable brake drum, a brake band adapted to be alternately engaged with and disengaged from said brake drum, a cam to engage the brake band to limit the disengaging movement thereof, means for maintaining the cam in constant engagement with the brake band, and automatic means for adjusting the cam to compensate for wear of the brake band.

8. In a brake, a rotatable brake drum, a brake band adapted to be alternately engaged with and disengaged from said brake drum, an abutment member to limit the disengaging movement of the brake band, means for rotatably adjusting the abutment member to compensate for wear of the brake band, and means for automatically effecting radial movement of the abutment member to maintain its contact with the brake band during actuation thereof.

9. In a brake, a rotatable brake drum, a brake band adapted to be alternately engaged with and disengaged from said brake drum, an abutment member to limit the disengaging movement of the brake band, said abutment member being in the nature of a cam which is rotatable on an axis substantially parallel with that of the brake drum, means acting upon the cam to maintain the latter in engagement with the brake band, and means supporting the abutment cam for limited radial movement of the cam to follow the brake band in the normal operating clearance.

10. In a brake, a rotatable brake drum, a brake band adapted to be alternately engaged with and disengaged from said brake drum, an abutment member to limit the disengaging movement of the brake band, said abutment member being in the nature of a cam which is rotatable on an axis substantially parallel with that of the brake drum, means acting radially upon the cam to maintain the latter in engagement with the brake band, means supporting the cam for radial movement to follow the brake band in the normal operating clearance, and means for automatically rotating the cam to maintain the clearance within predetermined limits and to compensate for wear of the brake band.

11. In combination with a brake having a rotatable brake drum and a cooperating brake band, an automatic slack take-up unit, comprising a fixed post adjacent the brake band, a stop member rotatably mounted on said post, a torsion spring surrounding a portion of the post, and acting on the stop member to keep it in engagement with the brake band, and means for automatically effecting radial movement of the stop member with reference to the post as the brake band is applied or released.

12. In combination with a brake having a rotatable brake drum and a cooperating brake band, an automatic slack take-up unit comprising a fixed post or stud extending into the plane of the brake drum, said post or stud having an annular flange intermediate its ends, a sleeve mounted on the stud and having a limited radial rocking movement on said flange which functions as a pivot point, a compression spring extending transversely in the end of the stud and acting upon the sleeve to control the rocking movement in one direction, a cam carried by the sleeve and engaging the brake band, and a torsion spring for rotating the cam to maintain its engagement with the brake band and thus automatically to compensate for wear of the brake band.

13. In a brake, a rotatable brake drum, a brake band adapted to be alternately engaged with and disengaged from said brake drum, stops to limit the released movement of the brake band, said stops having lost motion radially equal to the desired clearance between the drum and the band when disengaged, means for maintaining the stops in a pressing contact with the brake band during the required clearance travel, and means for automatically adjusting the stops to compensate for wear tending to cause more than predetermined clearance, thus insuring a uniform clearance, regardless of the brake band wear.

14. In a brake, a rotatable brake drum, an expansible and retractible brake band disposed within the brake drum, a fixed anchor member arranged intermediate the ends of the brake band to hold the brake band against rotation, and a plurality of independently automatic slack take-up units circumferentially spaced within the brake, said take-up units being in constant engagement with the brake drum and adapted to maintain a predetermined clearance between the brake band and the drum, regardless of wear of the braking parts, and one of said take-up units being associated with the anchor member.

15. In combination with a brake having a brake drum and a cooperating brake band, an automatic slack take-up unit comprising a fixed post or stud extending into the plane of the brake drum, said post or stud having an annular flange intermediate its ends, a sleeve mounted on the stud and having a limited radial rocking movement on said flange which functions as a pivot, a cam carried by the sleeve and engaging the brake band, a compression spring extending transversely in the end of the stud and acting upon the sleeve to control the rocking movement in one direction and thus to maintain the cam in frictional engagement with the brake band and a torsion spring for rotating the cam to maintain its frictional engagement, said torsion spring being active only after the compression spring has taken out the predetermined clearance accompanied by a reduction in the frictional engagement.

16. In combination with a brake having a rotatable brake drum and a cooperating brake band, an automatic slack take-up unit, comprising a fixed post adjacent the brake band, a stop member having limited radial movement with the brake band and being rotatable with reference to it, and a pair of springs acting conjointly to control said movements of the stop member whereby to maintain the parts of the brake in a predetermined relationship.

17. In combination with a brake drum and a brake band, a slack take-up unit comprising a spring-actuated cam in constant frictional engagement with the brake band to limit disengaging movement thereof, whereby to maintain a predetermined clearance.

18. In combination with a brake drum and a brake band, means for anchoring the brake band against rotation, and a slack take-up unit associated with said anchoring means, said slack take-up unit comprising a spring-actuated cam in constant frictional engagement with the brake band to limit disengaging movement thereof, whereby to maintain a predetermined clearance.

19. In combination with a brake having a brake drum and a cooperating brake band, a plurality of automatic slack-take-up units circumferentially spaced with reference to each other and adapted to suspend the brake band in substantially central position within the brake drum, each of said take-up units comprising a fixed post adjacent the brake band, a stop member having limited radial movement with the brake band and being rotatable with reference to it, and a pair of springs acting conjointly to control said movement of the stop member whereby to maintain the parts of the brake in predetermined relationship.

20. In combination, a pair of friction surfaces adapted to be moved into engagement and out of engagement, means for limiting the clearance between the surfaces, said means including a cam, means for rotating the cam about its axis, and means for moving the cam at an angle to its axis.

21. In combination, a pair of frictional surfaces adapted to be alternately engaged and disengaged with each other, a stop member to limit the disengaging movement of the surfaces and to maintain a predetermined clearance, said stop member including a cam, means for rotating the cam axially, and means for bodily moving the cam at an angle to the axis of the cam.

HUGH M. ROCKWELL.